United States Patent
Saby et al.

(10) Patent No.: US 9,391,520 B2
(45) Date of Patent: Jul. 12, 2016

(54) DISCONTINUOUS MODE DC-DC CONVERTER INCLUDING A VOLTAGE-CURRENT CONVERSION CIRCUIT FOR CONVERTING INTO CURRENT A DIFFERENCE BETWEEN AN OUTPUT VOLTAGE AND AN INPUT VOLTAGE OF SWITCHES OF THE CONVERTER

(71) Applicant: EM Microelectronic-Marin SA, Marin (CH)

(72) Inventors: Jérôme Saby, Neuchâtel (CH); Yves Theoduloz, Yverdon (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 14/559,326

(22) Filed: Dec. 3, 2014

(65) Prior Publication Data
US 2015/0155782 A1 Jun. 4, 2015

(30) Foreign Application Priority Data
Dec. 3, 2013 (EP) .................................... 13195405

(51) Int. Cl.
*H02M 3/158* (2006.01)
*H02M 1/00* (2006.01)

(52) U.S. Cl.
CPC ............ *H02M 3/158* (2013.01); *H02M 3/1588* (2013.01); *H02M 2001/0009* (2013.01); *Y02B 70/1466* (2013.01)

(58) Field of Classification Search
CPC . H02M 1/4225; H02M 3/1588; H02M 3/158; H02M 1/4216; H02M 3/156
USPC .......................... 323/234–235, 271, 282, 283
See application file for complete search history.

(56) References Cited

U.S. PATENT DOCUMENTS

| 6,151,233 A | 11/2000 | Kondo |
| 7,372,241 B1 * | 5/2008 | Tomiyoshi .......... H02M 3/1588 323/224 |
| 8,008,899 B2 | 8/2011 | Heim et al. |

(Continued)

FOREIGN PATENT DOCUMENTS

| EP | 1632827 A1 | 3/2006 |
| EP | 2 104 213 B1 | 9/2009 |

OTHER PUBLICATIONS

European Search Report issued in corresponding application EP 13195405.9 completed Apr. 29, 2014.

*Primary Examiner* — Harry Behm
*Assistant Examiner* — Peter Novak
(74) *Attorney, Agent, or Firm* — Oblon, McClelland, Maier & Neustadt, L.L.P.

(57) ABSTRACT

The DC-DC converter includes an inductor cooperating with a first switch and a second switch operating alternately, in order to supply an output voltage of higher, equal or lower level than the level of an input voltage. The converter includes a switching control unit for the switches for determining a first switching time for the first switch and a second switching time for the second switch. The switching control unit includes a voltage-current conversion circuit for converting into current a comparison voltage, which is the difference between the output voltage and the input voltage, a first current being supplied by the conversion circuit for charging a first capacitor to a first voltage threshold to determine the first switching time and a second current being supplied by the conversion circuit for charging a second capacitor to a second voltage threshold to determine the second switching time.

16 Claims, 4 Drawing Sheets

(56) References Cited

U.S. PATENT DOCUMENTS 8,866,464 B2 * 10/2014 Ragona ............... H02M 3/1588 323/284

2006/0061342 A1 3/2006 Bernacchia et al.
2009/0237039 A1 9/2009 Heim et al.
2009/0243577 A1 10/2009 Lim

* cited by examiner

DISCONTINUOUS MODE DC-DC CONVERTER INCLUDING A VOLTAGE-CURRENT CONVERSION CIRCUIT FOR CONVERTING INTO CURRENT A DIFFERENCE BETWEEN AN OUTPUT VOLTAGE AND AN INPUT VOLTAGE OF SWITCHES OF THE CONVERTER

This application claims priority from European patent application No. 13195405.9 filed Dec. 3, 2013, the entire disclosure of which is hereby incorporated herein by reference.

FIELD OF THE INVENTION

The invention concerns a DC-DC converter operating in discontinuous mode. The DC-DC converter includes an inductor cooperating with a first switch and a second switch operating alternately, in order to supply an output voltage of higher, equal or lower level than the level of an input voltage. The converter also includes a switching control unit for the switches for determining a first switching time for the first switch during which an increasing current flows through the inductor, and a second switching time for the second switch during which a decreasing current flows through the inductor.

The invention also concerns a method of actuating a DC-DC converter.

BACKGROUND OF THE INVENTION

A DC-DC voltage converter can convert a continuous input voltage, which may be a voltage from a continuous voltage source, into a continuous output voltage via an inductor between the input and the output as reactive component. Since the voltage source may be a battery, which discharges over time, the converter may sometimes also be arranged to guarantee an output voltage at a determined value independently of a drop in input voltage.

Various types of inductive DC-DC converters may be used. A first type of DC-DC converter is the Buck converter which can supply an output voltage of lower value than the input voltage value. A second type of DC-DC converter is the Boost converter which can supply an output voltage of higher value than the input voltage value. A third type of DC-DC converter can combine a Buck converter and a Boost converter to raise or lower the output voltage.

FIG. 1 shows an inductive DC-DC converter, which is a Boost converter generally used in low power electronic circuits, powered by a battery of small dimensions. The DC-DC converter includes an inductor L as reactive component, a PMOS transistor P1 and an NMOS transistor N1, which act as switches. PMOS transistor P1 and NMOS transistor N1 are series connected. Inductor L is disposed between a positive terminal Vbat of a continuous voltage source Bat, and a connection node of the drain terminals of transistors P1 and N1. The source terminal of transistor N1 is connected to an earth terminal, whereas the source terminal of transistor P1 is connected to an output terminal Vout, where filtering is performed by the capacitor C connected in parallel to a charge resistor $R_L$.

Transistors P1 and N1 are operated alternately, each by a respective control signal CK1 and CK2 across their respective gate terminal. Control signal CK1 defines a first converter control phase, whereas control signal CK2 defines a second converter control phase. During a first determined time period, control signal CK1 is at the high state to make NMOS transistor N1 conductive. During a second determined time period subsequent to the first time period, control signal CK2 is at the low state to make PMOS transistor P1 conductive.

During the first time period, the current in inductor L increases linearly, whereas during the second time period, the current in inductor L decreases linearly, ideally to reach zero. If, at the end of the second time period, the current through the inductor is not zero, an adjustment must be made to the second time period. This adjustment of the second time period is generally necessary for a discontinuous mode DC-DC converter. It sometimes requires at least one fast comparator, which causes high power consumption.

EP Patent No 2 104 213 B1 discloses a control method for a discontinuous mode DC-DC converter. The duration of the second time period, during which the current in the inductor decreases, is controlled so that the current is zero at the and of the second time period. The sign of overvoltage caused by the inductor during switching at the end of the second time period makes it possible to adjust the duration of the second time period. However, this principle of adjustment of the second time period by controlling overvoltage requires the use of fast electronic components, which causes high power consumption thereby constituting a drawback.

SUMMARY OF THE INVENTION

It is therefore an object of the invention to overcome the drawbacks of the state of the art by providing a discontinuous mode DC-DC converter that can easily adjust the current increase and decrease times through the inductor so that the current is zero at the end of a second time period of decreasing the current in the inductor.

The invention therefore concerns the afore-cited discontinuous mode DC-DC converter, which includes an inductor as reactive component, at least a first switch connected to the inductor and controlled by a first control signal, and at least a second switch connected to the inductor and controlled by a second control signal, the first and second switches operating alternately to supply an output voltage of a higher, equal or lower level than the level of an input voltage, the converter also including a switching control unit for the switches for determining a first switching time of the first switch during which an increasing current flows through the inductor, and a second switching time of the second switch during which a decreasing current flows through the inductor, wherein the switching control unit includes a voltage-current conversion circuit for converting into current a comparison voltage, which is the difference between the output voltage and the input voltage, a first current being supplied by the voltage-current conversion circuit for charging a first capacitor to a first voltage threshold to determine the first switching time and a second current being supplied by the voltage-current conversion circuit for charging a second capacitor to a second voltage threshold to determine the second switching time on the basis of the determination of the first switching time.

One advantage of the DC-DC converter according to the invention lies in the fact that it includes means for determining, by calculation, the duration of the second time period based on determination of the first time period, so that the cu rent is zero through the inductor at the end of the second time period.

Advantageously, an analogue adjustment is made to the switching times of the switches of the DC-DC converter. This adjustment is performed by a switching control unit in a simple manner. No digital processing with high frequency clocking is necessary, which reduces the power consumption of such a DC-DC converter.

Advantageously, the first switching or closing time of the first switch connected to the inductor in a first control phase of the DC-DC converter, is determined based on the charge of a first capacitor. The first capacitor is charged by a first current from a current mirror generated by a resistor powered by the difference in voltage between the output voltage and the input voltage. The first capacitor is charged to a first voltage threshold, which may advantageously be the difference in voltage between the output voltage and the input voltage. This first switching time can therefore be defined as the resistive value of the resistor multiplied by the capacitive value of the first capacitor.

Advantageously, the second switching time of the second switch connected to the inductor in a second control phase of the DC-DC converter, is determined based on determination of the first switching time. A second capacitor is charged by a second current from a current mirror. This second capacitor is charged to a second voltage threshold, which is preferably the input voltage. In these conditions, if the currents through the resistor and for charging the capacitor are identical, it is easily possible to determine the second switching time on the basis of the first switching time.

To this end, the invention also concerns a method of actuating a DC-DC converter, which includes, in each control cycle of the DC-DC converter, the method includes the steps consisting in:
 closing the first switch via the first control signal with the second switch in an open state, a first current being supplied by the voltage-current conversion circuit for charging the first capacitor to a first voltage threshold to determine the first switching time of the first switch, and
 at the end of the first switching time, closing the second switch via the second control signal with the first switch controlled to be opened, a second current being supplied by the voltage-current conversion circuit for charging the second capacitor to a second voltage threshold to determine the second switching time of the second switch on the basis of the determination of the first switching time.

BRIEF DESCRIPTION OF THE DRAWINGS

The objects, advantages and features of the discontinuous mode DC-DC converter, and the method of actuating the DC-DC converter, will appear more clearly in the following description made on the basis of at least one non-limiting embodiment, illustrated b the drawings, in which.

DETAILED DESCRIPTION OF THE INVENTION

In the following description, all those elements of the discontinuous mode DC-DC converter that are well known to those skilled in the art in this technical field will be described only in a simplified manner. Reference is mainly made to a Boost converter, although another type of converter may also be provided with adjustment of the times for increasing and decreasing the current through the inductor according to the invention.

Figure 2:
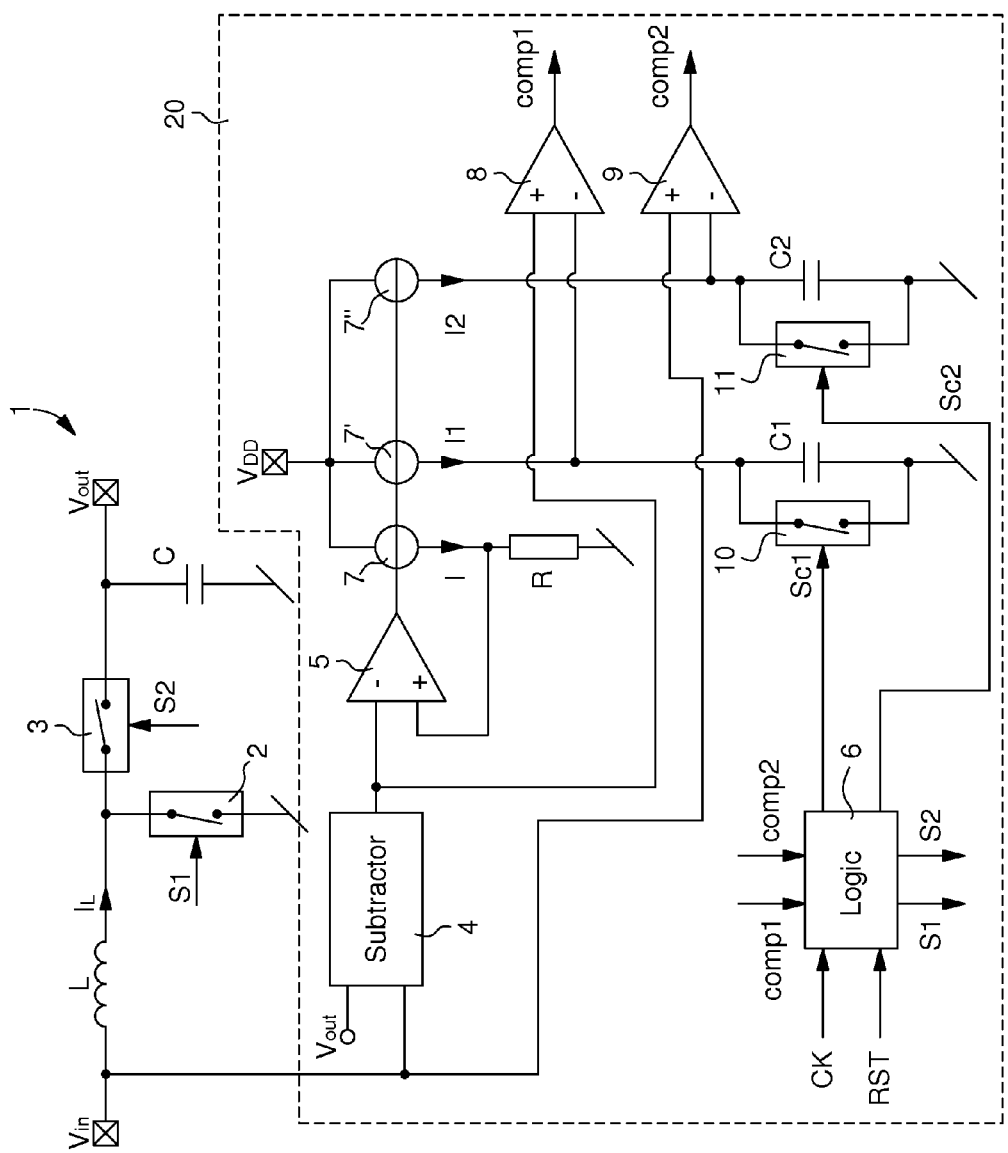
FIG. 2 shows a simplified view of an embodiment of a DC-DC Boost converter with a unit controlling the switch opening and closing times for increasing and decreasing the current through an inductor of the converter according to the invention.

FIG. 2 shows a schematic view of a DC-DC Boost converter 1, i.e. a voltage boost converter with a higher level of output voltage Vout than the level of continuous input voltage Vin. This input voltage Vin may be derived from a battery or a solar cell, which are not shown. In the case of a solar cell, the input voltage may be around 0.6 V, while the output voltage may be around 3 V, but other values may be envisaged. A storage capacitor C for output voltage Vout is connected to the output of DC-DC converter 1. This capacitor C may also be connected in parallel to the output of a charge resistor (not shown), which may form a filtering component.

The DC-DC converter includes, in particular, an inductor L as reactive component, a first switch 2 controlled by a first control signal S1 and a second switch 3 controlled by a second control signal S2. The control signals are generated by a switching control unit 20 explained below with analogue switching or closing control of the first and second switches 2 and 3. In a second DC-DC converter control phase, the switching time of the second switch 3 is determined, by calculation, as a function of the switching time of first switch 2 in the first phase.

In this DC-DC converter, the relation between the current $I_L$ flowing through inductor L and voltage $U_L$ can be defined. This relation is defined by the equation $U_L = L \cdot (dI_L/dt)$. Since voltage $U_L$ is generally constant, the current $I_L$ flowing through inductor L increases or decreases linearly. This voltage $U_L$ may be input voltage Vin. Thus, the time t1 during which the first switch 2 is made conductive, i.e. allows the increasing current through inductor L, is defined by the equation $t1 = L \cdot I_L/Vin$. This voltage $U_L$ may also be the difference between output voltage Vout and input voltage Vin. Thus, the time t2 during which the second switch 3 is made conductive, i.e. allows the decreasing current through inductor L, is defined by the equation $t2 = L \cdot I_L/(Vout-Vin)$. It is therefore possible to determine time t2 on the basis of time t1 by the equation $t2 = t1 \cdot (Vin/(Vout-Vin))$ in an ideal case.

To determine the first and second switching times t1 and t2 of the two switches 2 and 3, switching control unit 20 includes a voltage-current conversion circuit. This voltage-current conversion circuit is arranged to convert into current a comparison voltage, which is the difference between output voltage Vout and input voltage Vin. A first current I1 is provided for charging a first capacitor C1 to determine the first switching time t1, and a second current I2 is provided for charging a second capacitor C2 to determine the second switching time t2. This voltage difference Vout−Vin may be provided by a subtractor 4 of switching control unit 20. This subtractor 4 receives at input input voltage Vin and output voltage Vout. The voltage difference Vout−Vin must be positive for the voltage-current conversion to occur. For a Buck converter, this requires forming the voltage difference Vin−Vout.

The voltage-current conversion circuit includes an amplifier-comparator 5, whose first input receives the voltage difference Vout−Vin and whose second input is connected to a resistor R. The output of amplifier-comparator 5 controls a current mirror 7, 7', 7", whose first branch is connected to resistor R to determine the current I, I1, I2 in each branch of the current mirror. The basic current I in the first branch is thus defined by the equation I=(Vout−Vin)/R. A first mirrored current I1 in a second branch 7' of the current mirror charges a first capacitor C1 of switching control unit 20 to determine the first switching time t1 of first switch 2. A second mirrored current I2 in a third branch 7" of the current mirror charges a second capacitor C2 of switching control unit 20 to determine the second switching time t2 of second switch 3.

For this DC-DC Boost converter 1, resistor R is connected to the earth terminal, whereas the current mirror is connected to a positive voltage terminal $V_{DD}$, which may be output voltage Vout. The voltage difference Vout−Vin is supplied to the negative input of amplifier-comparator 5, whereas the node connecting resistor R to the first branch 7 of the current mirror is connected to the positive input of amplifier-comparator 5.

The current mirror is preferably formed in each branch 7, 7', 7" of a PMOS transistor. The source of each PMOS transistor is connected to the positive voltage terminal $V_{DD}$. The gate of each PMOS transistor is connected to the output of amplifier-comparator 5 to be controlled by the output signal of amplifier-comparator 5. The drain of the first PMOS transistor is connected to resistor R and to the positive input of amplifier-comparator 5. The drain of the second PMOS transistor is connected to first capacitor C1 and the drain of the third PMOS transistor is connected to the second capacitor C2. Each capacitor C1 and C2 is connected to the earth terminal.

To determine the first and second switching times t1 and t2 of the first and second switches 2 and 3, capacitors C1 and C2 are initially discharged. No voltage remains across the capacitor electrodes prior to each determination of the first and second switching times. To achieve this, a third switch 10 is connected and placed in parallel to the first capacitor C1, and a fourth switch 11 is connected and placed in parallel to second capacitor C2. The third switch 10 is controlled by a third control signal Sc1, while the fourth switch 11 is controlled by a fourth control signal Sc2. The third and fourth switches 10 and 11 of switching control unit 20 are in a closed state to discharge the two capacitors C1 and C2.

The third and fourth control signals Sc1 and Sc2 are provided by a logic circuit 6 of switching control unit 20. This logic circuit 6 is clocked by a clocking signal CK from an oscillator of the converter to define each control cycle of the discontinuous mode DC-DC converter as explained below with reference to FIG. 3. This logic circuit 6 also supplies the first and second signals S1 and S2 to control first and second switches 2 and 3 alternately.

To determine the first switching or closing time t1 of first switch 2, the current I1 in the second branch of the current mirror charges first capacitor C1, when clocking signal CK changes state, for example on a rising edge of said signal CK. The frequency of the clocking signal is the inverse of the period T of each cycle. During the change from the initial state of clocking signal CK, the third switch 10 is opened by third control signal Sc1, whereas the fourth switch 11 is still in a closed state as a result of the fourth control signal Sc2. The first capacitor C1 is charged to a first voltage threshold. Once the first voltage threshold is reached, logic circuit 6 is controlled to open the fourth switch 11 and to leave the third switch 10 open. During this change, first switch 2 is opened by first control signal S1 from logic circuit 6, whereas second switch 3 is closed by the second control signal S2 from logic circuit 6.

To determine the second switching or closing time t2 of second switch 3, the current I2 from the third branch of the current mirror charges second capacitor C2. The second capacitor C2 is charged to a second voltage threshold. As soon as the second voltage threshold is reached, logic circuit 6 is controlled to close the third switch 10, while the fourth switch 11 can remain in an open state until the end of period T of the cycle. During this change, second switch 3 is opened by second control signal S2 from logic circuit 6, whereas first switch 2 is still open until the end of period T of the cycle.

It is to be noted that switching control unit 20 may also include a first comparator 8 for comparing the voltage across first capacitor C1 on charge to the first voltage threshold, which may be the output signal from subtractor 4. This output signal is the difference between output voltage Vout and input voltage Vin. The output signal from subtractor 4 is supplied to the positive input of the first comparator 8, while the first capacitor C1 is connected to the negative input of first comparator 8. First comparator 8 supplies a first comparison signal comp1 to logic circuit 6 to control logic circuit 6 as soon as the voltage across the first capacitor C1 on charge attains the voltage difference between output voltage Vout and input voltage Vin. The change of state of first comparison signal comp1 controls the opening of first switch 2 and the closing of second switch 3 via logic circuit 6. The fourth switch 11 is also opened by this first comparison signal comp1, in order to start the second switching time of second switch 3.

Switching control unit 20 may also include a second comparator 9 for comparing the voltage across second capacitor C2 on charge to the second voltage threshold, which may be the input voltage Vin. Input voltage Vin is supplied to the positive input of second comparator 9, while the second capacitor C2 is connected to the negative input. The second comparator 9 supplies a second comparison signal comp2 to logic circuit 6 to control logic circuit 6 as soon as the voltage across the second capacitor C2 on charge attains input voltage Vin. The change of state of the second comparison signal comp2 controls the opening of second switch 3, while the first switch 2 remains open until the end of the cycle period T in this discontinuous mode. The third switch 10 is, however, controlled to be closed by third control signal Sc1 so as to discharge first capacitor C1 before the start of a new cycle.

As explained above, the invention relies on the idea of defining a first switching time t1 of first switch 2. This first switching time t1 is defined by the resistive value of resistor R and the capacitive value of the first capacitor C1. The current in the first branch, i.e. in the first PMOS transistor is defined by the equation I=(Vout−Vin)/R. In the case where the first mirrored current I1 in second branch 7' is identical to current I, the first switching time t1 of the first switch 2 is defined by the equation t1=C1·(Vout−Vin)/I, thus t1=C1·R. In the case where the second mirrored current I2 in the third branch 7" is identical to current I, the second switching time t2 can be defined by the equation t2=C2·R·Vin/(Vout−Vin). Further, if the capacitive values of the two capacitors C1 and C2 are identical, the second time t2 can be defined on the basis of the first time t1 by the equation t2=t1·Vin/(Vout−Vin).

It is also to be noted that it is possible to envisage adjusting any noise or stray in the DC-DC converter. This noise concerns the ohmic values of the switches, the inductor resistance, offset errors in the comparators and the amplifier-comparator, which may be an operational amplifier. With this noise, the optimum switching time of second switch 3 is shorter than the aforementioned theoretical value. It is possible to adjust the switching times of the first and second switches 2 and 3 by modifying the ratio of the capacitive values of the first and second capacitors C1 and C2 or also by modifying the ratio of the current mirror currents.

The adjustment of the second switching time t2 of the second switch may take account of the relations between capacitors C1 and C2 and currents I1 and I2 according to the following formulae:

$$N=C1/C2 \text{ et } M=I1/I2$$

$$t2=(Vin/(Vout-Vin)) \cdot t1 \cdot M/N$$

It is also to be noted that the first and second capacitors C1 and C2 may be formed of several individual capacitors to ensure better capacitor matching. It is also possible to arrange to modify the value of currents I1 and I2 by the number of transistors in parallel in each branch of the current mirror.

In the DC-DC converter, there is defined the switching or closing time of first switch 2, and the analogue calculation of the switching or closing time of second switch 3. The principle of pulse width modulation may be used by varying the closing time of first switch 2, and consequently also the closing time of second switch 3 with the same frequency of clocking signal CK. The frequency of clocking signal CK may also be modified by fixing the closing time of first switch 2 and subsequently of second switch 3. The closing times of the first and second switches 2 and 3 are defined or calculated so that, at the end of the second closing time, there is zero current through inductor L.

Figure 1:
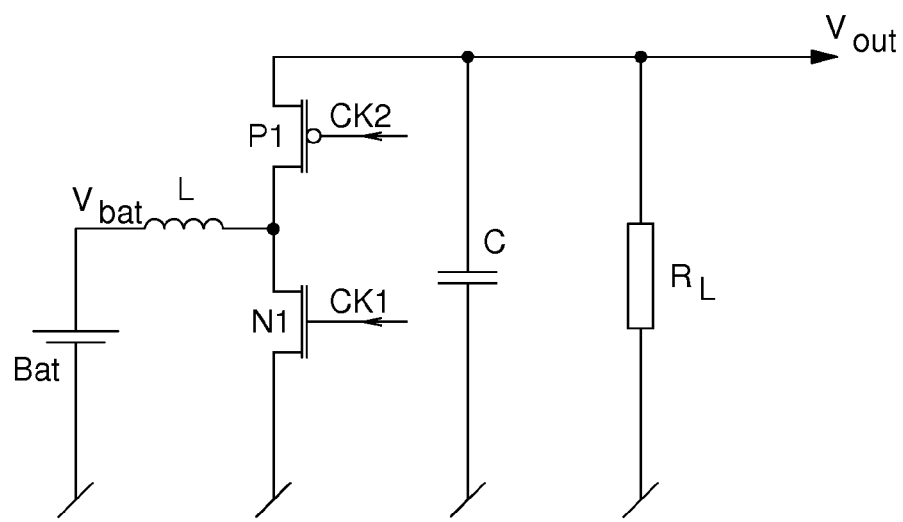
FIG. 1, already cited, shows a state-of-the-art DC-DC Boost converter.

The first, second, third and fourth switches, 2, 3, 10, 11 may be MOS transistors. There may be four NMOS transistors, but the second switch 3 could also be a PMOS transistor able to be controlled by an inverted second signal S2, Inductor L with the first and second switches 2 and 3 may be arranged as shown in FIG. 1.

Figure 4:
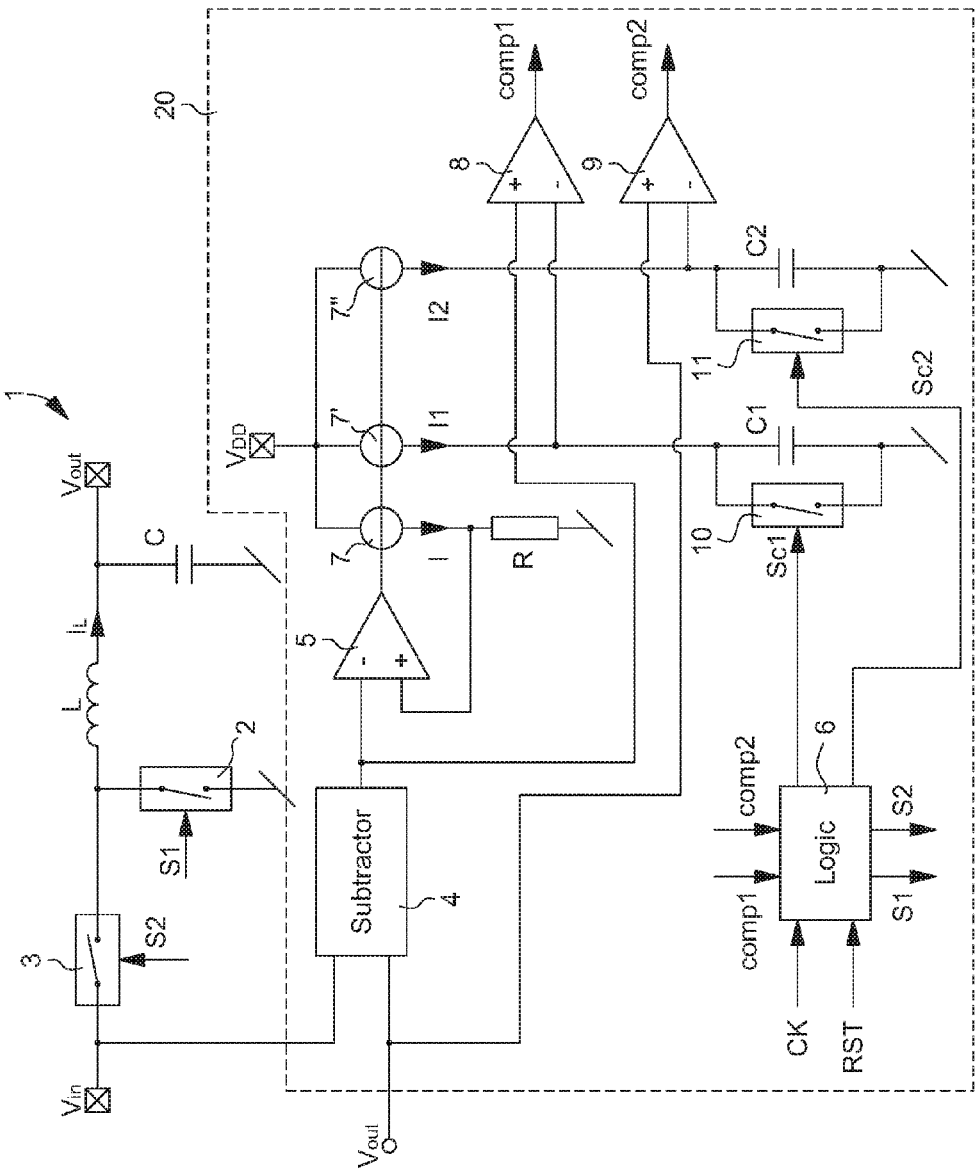
FIG. 4 shows a simplified view of an embodiment of a DC-DC Buck converter with a unit controlling the switch opening and closing times for increasing and decreasing the current through an inductor of the converter according to the invention.

In a variant embodiment as shown in FIG. 4, the DC-DC converter may be a Buck converter. In that case, the switching control unit can be fully incorporated for controlling the first and second switches. However, the subtractor supplies a signal Vin-Vout on the basis of which the currents I, I1 and I2 are determined. If the capacitive value C of all the capacitors is identical, the first switching time t1 is defined by t1=R·C, The second switching time t2 is defined by t2=R·C·(Vout/(Vin−Vout))=t1·(Vout/(Vin−Vout)).

Figure 3:
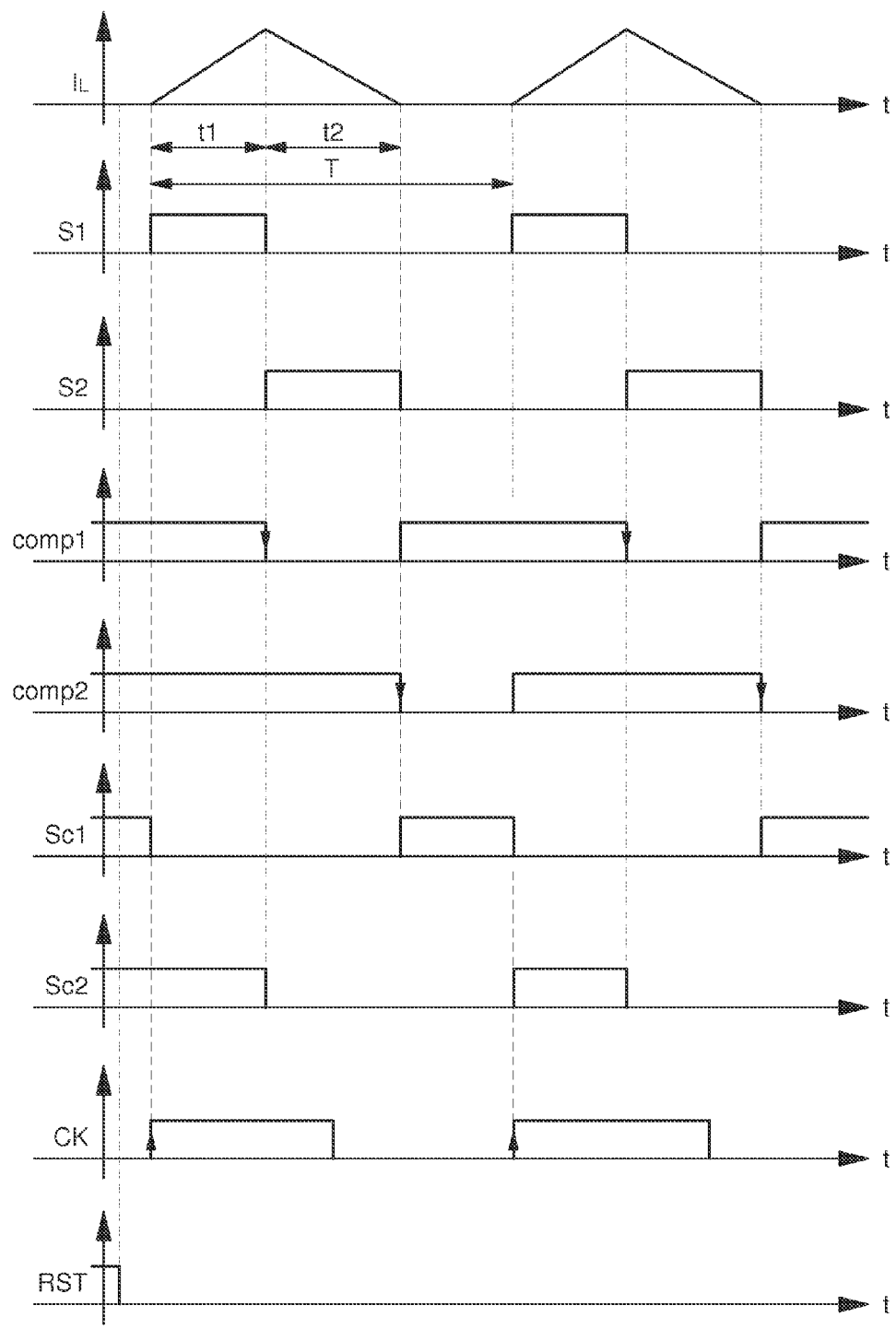
FIG. 3 shows graphs of the shape of the current flowing through the inductor and of the control signals for adjusting the current increase and decrease times in the inductor of the DC-DC convene according to the invention.

To better illustrate the arrangement of the various control or clocking signals in the discontinuous mode DC-DC converter, reference may be made to FIG. 3. Initially, a zero reset signal RST is applied to logic circuit 6. Generally, in this zero reset state, at least the voltage-current conversion circuit with the current mirror and comparators are deactivated. However, it is possible to envisage having control signals comp1, comp2, Sc1 and Sc2 in a high state. Initially, the third and fourth switches 10, 11 are closed, which discharges the two capacitors C1, C2, and the comparison signals comp1 and comp2 are at the high state.

As soon as clocking signal CK changes state, for example on a rising edge, logic circuit 6 controls the closing of first switch 2 by first control signal S1. The third switch 10 is also opened by the third control signal Sc1. From that moment, there is a voltage charge across first capacitor C1 until the end of time t1, which corresponds to the moment at which the voltage across capacitor C1 becomes higher than the voltage difference between output voltage Vout and input voltage Vin. The first comparison signal comp1 changes from the high state to the low state to control logic circuit 6, to open first switch 2 via first control signal S1 and to close second switch 3 via second control signal S2. The fourth switch 11 is controlled by fourth control signal Sc2 to be opened. From that moment, second capacitor C2 is charged until it reaches the level of input voltage Vin which determines the second switching time t2. The second comparison signal comp2 changes from the high state to the low state to control logic circuit 6. Logic circuit 6 controls the opening of second switch 3 via second control signal S2, while keeping first switch 2 open until the end of the control cycle period T of the DC-DC converter. The third switch 10 can be closed by the third control signal Sc1, while the fourth switch may remain open until the start of a subsequent cycle.

From the description that has just been given, several variants of the discontinuous mode DC-DC converter can be devised by those skilled in the art without departing from the scope of the invention defined by the claims. The DC-DC converter may include two outputs with a single inductor as reactive component.

What is claimed is:

1. A DC-DC converter, comprising:
an inductor as reactive component, at least a first switch connected to the inductor and controlled by a first control signal, and at least a second switch connected to the inductor and controlled by a second control signal, the first and second switches operating alternately to supply an output voltage of a higher or lower level than the level of an input voltage, the converter also including a switching control unit for the switches for determining a first switching time of the first switch during which an increasing current flows through the inductor, and a second switching time of the second switch during which a decreasing current flows through the inductor,
wherein the switching control unit includes a voltage-current conversion circuit for converting into current a comparison voltage, which is the difference between the output voltage and the input voltage, a first current being supplied by the voltage-current conversion circuit for charging a first capacitor to a first voltage threshold to determine the first switching time and a second current being supplied by the voltage-current conversion circuit for charging a second capacitor to a second voltage threshold to determine the second switching time on the basis of the determination of the first switching time.

2. The DC-DC converter according to claim 1, wherein the voltage-current conversion circuit includes an amplifier-comparator, whose first input receives the difference between the output voltage and the input voltage, and whose second input is connected to a resistor, and wherein an output of the amplifier-comparator controls a current mirror, whose first branch is series connected to the resistance for determining a basic current to be mirrored in the current mirror to define a first current in a second branch and a second current in a third branch of the current mirror.

3. The DC-DC converter according to claim 2, wherein the difference between the output voltage and the input voltage is supplied to a negative input of the amplifier-comparator, and in that a node connecting the resistor to the first branch of the current mirror is connected to a positive input of the amplifier-comparator, the resistor being connected to an earth terminal.

4. The DC-DC converter according to claim 3, wherein the current mirror is formed of PMOS transistors arranged in parallel, a source of each transistor being connected to a positive voltage terminal, a gate of each transistor being connected to the output of the amplifier-comparator, in that a drain of at least a first PMOS transistor in the first branch is connected to the resistor and to the positive input of the amplifier-comparator, in that a drain of at least a second PMOS transistor is connected to the first capacitor to supply a first charging current, and in that a drain of at least a third PMOS transistor is connected to the second capacitor to supply a second charging current.

5. The DC-DC converter according to claim 2, wherein the basic current is identical to the first current, and in that the first voltage threshold is equal to the difference between the output voltage and the input voltage so that the first switching time of the first switch is determined by the resistive value of the resistor multiplied by the capacitance of the first capacitor.

6. The DC-DC converter according to claim 5, wherein the basic current is identical to the second current, in that the capacitance of the first capacitor is equal to the capacitance of the second capacitor and in that the second voltage threshold is equal to the input voltage so that the second switching time of the second switch is determined by the formula $t2=t1\cdot(Vin/(Vout-Vin))$, where t1 is the first switching time, t2 is the second switching time, Vin is the input voltage and Vout is the output voltage.

7. The DC-DC converter according to claim 1, wherein the switching control unit includes a subtractor receiving the output voltage at a first input and the input voltage at a second input in order to supply an output signal, which is the difference between the output voltage and the input voltage.

8. The DC-DC converter according to claim 1, wherein in the switching control unit, a third switch is connected and placed in parallel to the first capacitor, the third switch being controlled by a third control signal supplied by a logic circuit of the converter, the third switch being in a closed state for discharging the first capacitor and in an open state for charging the first capacitor to determine the first switching time, and in that a fourth switch is connected and placed in parallel to the second capacitor, the fourth switch being controlled by a fourth control signal supplied by the logic circuit, the fourth switch being in a closed state for discharging the second capacitor and in an open state for charging the second capacitor to determine the second switching time.

9. The DC-DC converter according to claim 1, wherein the switching control unit includes a first comparator for comparing the first voltage threshold to the voltage across the first capacitor in charging phase to determine the first switching time of the first switch, a first comparison signal being supplied by the first comparator to control a logic circuit of the converter, in order to keep the first switch closed, when the voltage across the first capacitor is below the first voltage threshold and to open the first switch, when the voltage across the first capacitor is above the first voltage threshold.

10. The DC-DC converter according to claim 9, wherein the first voltage threshold is the difference between the output voltage and the input voltage.

11. The DC-DC converter according to claim 1, wherein the switching control unit includes a second comparator for comparing the second voltage threshold to the voltage across the second capacitor in charging phase to determine the second switching time of the second switch, a second comparison signal being supplied by the second comparator to control a logic circuit of the converter, in order to keep the second switch closed when the voltage across the second capacitor is below the second voltage threshold and to open the second switch when the voltage across the second capacitor is above the second voltage threshold.

12. The DC-DC converter according to claim 11, wherein the second voltage threshold is the input voltage.

13. The DC-DC converter according to claim 1, wherein the switching control unit includes a logic circuit, which is clocked by a clocking signal from an oscillator of the converter, so as to define each control cycle of the DC-DC converter, and which supplies the first and second control signals to the first and second switches.

14. A method of actuating a DC-DC converter according to claim 1, wherein, in each control cycle of the DC-DC converter, the method comprises:
  closing the first switch via the first control signal with the second switch in an open state, a first current being supplied by the voltage-current conversion circuit for charging the first capacitor to a first voltage threshold to determine the first switching time of the first switch, and
  at the end of the first switching time, closing the second switch via the second control signal with the first switch controlled to be opened, a second current being supplied by the voltage-current conversion circuit for charging the second capacitor to a second voltage threshold to determine the second switching time of the second switch on the basis of the determination of the first switching time.

15. The method of actuating a DC-DC converter according to claim 14, wherein the first capacitor is charged by the first current to determine the first switching time until the voltage across the first capacitor attains the first voltage threshold, which is the difference between the output voltage and the input voltage.

16. The method of actuating a DC-DC converter according to claim 14, wherein the second capacitor is charged by the second current to determine the second switching time until the voltage across the second capacitor attains the second voltage threshold, which is the input voltage.

* * * * *